United States Patent
Bochenek

(10) Patent No.: US 9,625,794 B2
(45) Date of Patent: Apr. 18, 2017

(54) PORTABLE STUDIO FOR ITEM PHOTOGRAPHY

(71) Applicant: ORBITVU SP Z O.O., Tarnowskie Góry (PL)

(72) Inventor: Tomasz Bochenek, Tarnowskie Góry (PL)

(73) Assignee: ORBITVU Sp. z o.o., Tarnowskie Góry (PL)

( * ) Notice: Subject to any disclaimer, the term of this patent is extended or adjusted under 35 U.S.C. 154(b) by 0 days.

(21) Appl. No.: 14/915,247

(22) PCT Filed: Aug. 29, 2014

(86) PCT No.: PCT/PL2014/000098
§ 371 (c)(1),
(2) Date: Feb. 28, 2016

(87) PCT Pub. No.: WO2015/030615
PCT Pub. Date: Mar. 5, 2015

(65) Prior Publication Data
US 2016/0202599 A1    Jul. 14, 2016

(30) Foreign Application Priority Data

Aug. 31, 2013 (PL) .................... 405202

(51) Int. Cl.
*G03B 15/07* (2006.01)
*G03B 17/56* (2006.01)

(52) U.S. Cl.
CPC ........... *G03B 17/568* (2013.01); *G03B 15/07* (2013.01); *G03B 17/561* (2013.01)

(58) Field of Classification Search
CPC ........ G03B 15/06; G03B 15/07; G03B 17/53; G03B 17/561; G03B 17/568
See application file for complete search history.

(56) References Cited

U.S. PATENT DOCUMENTS

| | | | |
|---|---|---|---|
| 1,650,415 A | 3/1932 | Robinson | |
| 2,567,561 A | 9/1951 | Hormann | |
| 2,967,455 A | 1/1961 | McCormack | |
| 3,608,462 A * | 9/1971 | Groshong | A61B 5/103 108/147 |
| 3,643,085 A | 2/1972 | Durand | |
| 4,236,795 A * | 12/1980 | Kephart | G03B 15/06 396/3 |

(Continued)

FOREIGN PATENT DOCUMENTS

| | | |
|---|---|---|
| CN | 2914140 | 4/2006 |
| CN | 202330966 | 7/2012 |

(Continued)

*Primary Examiner* — W B Perkey
(74) *Attorney, Agent, or Firm* — Andrew Malarz

(57) ABSTRACT

A portable studio for item photography is developed as a closed container whose base (1), sides (2) with covers (3) and rotating table (4) are immobile and interconnected, and with a movable, rotating housing (5) with a holder (7) for attaching the photographic camera. There is a rotating table (4) inside the housing and light sources (14) in the housing. The housing consists of two coaxial surfaces—outer (5) and inner (6), in a shape approximating a cylinder, between which the light sources (14) are distributed horizontally and in sections.

8 Claims, 5 Drawing Sheets

(56) References Cited

U.S. PATENT DOCUMENTS

Figure 1:
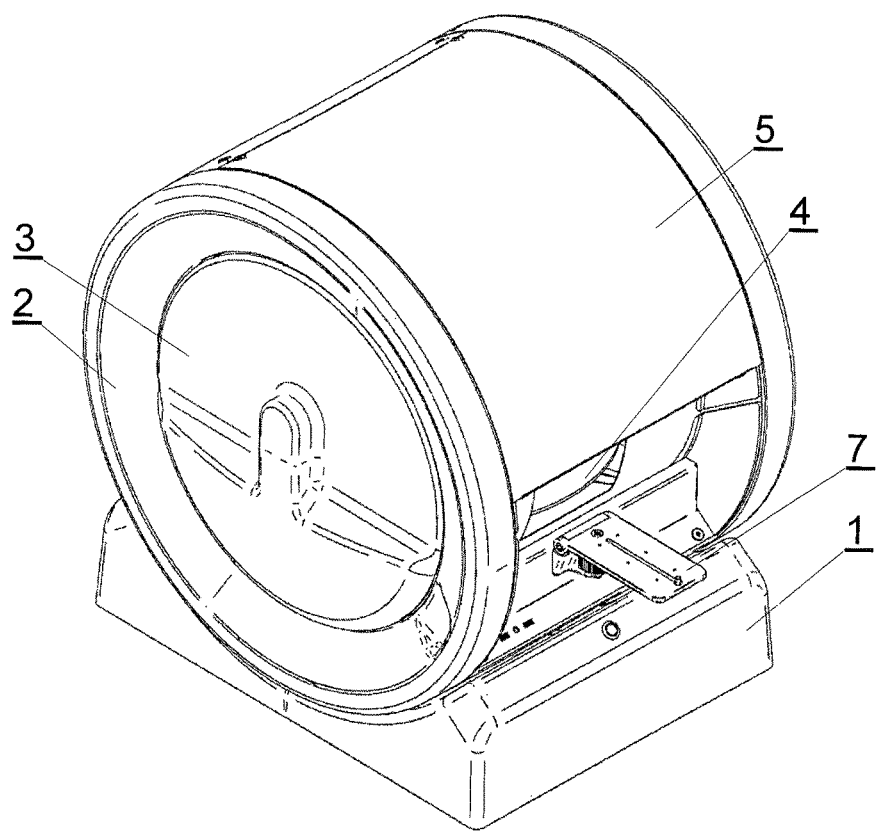

| | | |
|---|---|---|
| 4,292,662 A | 9/1981 | Gasperini |
| 4,372,659 A | 2/1983 | Ogawa |
| 6,106,124 A | 8/2000 | Tarsia |
| 6,270,228 B1* | 8/2001 | Axen ............... G03B 15/07 362/11 |
| 7,184,047 B1* | 2/2007 | Crampton ........... G06T 17/00 345/473 |
| 8,462,206 B1* | 6/2013 | McGuire ........... G06T 1/0007 348/135 |
| 2002/0186555 A1* | 12/2002 | Debevec ............ G03B 15/02 362/11 |
| 2003/0206735 A1* | 11/2003 | Saigo ............... G03B 15/06 396/1 |
| 2007/0172216 A1 | 7/2007 | Lai et al. |
| 2010/0128462 A1 | 5/2010 | Chern |
| 2011/0310242 A1* | 12/2011 | Knupfer ............. G01N 21/15 348/92 |
| 2016/0202599 A1* | 7/2016 | Bochenek ........... G03B 15/07 396/4 |

FOREIGN PATENT DOCUMENTS

| | | |
|---|---|---|
| CN | 203148437 | 8/2013 |
| DE | 102011051518 | 1/2013 |
| FR | 2637391 | 4/1990 |
| FR | 2776085 | 9/1999 |
| FR | 2946158 | 12/2010 |
| GB | 2487086 | 7/2012 |
| GB | 2492111 | 12/2012 |
| JP | H-09268296 | 11/1997 |
| JP | H-11109460 | 4/1999 |
| JP | 2000035607 | 2/2000 |
| JP | 2004145023 | 5/2004 |
| JP | 2006323168 | 11/2006 |
| JP | 2008065241 | 3/2008 |
| PL | 329419 | 4/1999 |

\* cited by examiner

PORTABLE STUDIO FOR ITEM PHOTOGRAPHY

CROSS-REFERENCE TO RELATED APPLICATIONS

This Patent Cooperation Treaty Application No. PCT/PL2014/000098, filed on Aug. 29, 2014, enters the national phase in the United States pursuant to 35 U.S.C. 371, and claims the benefit of the Polish Patent Application P.405202, filed Aug. 31, 2013, the contents of which are incorporated herein by reference.

BACKGROUND OF THE INVENTION (1) Field of the Invention

The object of the invention is a device in the form of a portable studio intended for item photography, particularly for small items, for example watches, jewelry.

(2) Description of Related Art Including Information Disclosed Under 37 CFR 1.97 and 1.98.

There is a number of known small, portable devices imitating the lighting conditions of large photographic studios and intended for the photography of small objects. There are known simple devices in the form of an incompletely closed space delimited by interconnected walls, as is the case in the descriptions of inventions U.S. Pat. No. 2,967,455, U.S. Pat. No. 2,567,561, U.S. Pat. No. 3,643,085, FR2637391, FR2946158, JP2008065241, CN2914140, JP2004145023.

There are known devices in the form of containers. One of them is a small container for photographing described in U.S. Pat. No. 4,292,662, provided with an integral lighting system with three semitransparent and light-reflecting surfaces. These surfaces form the walls of the container and one of them has a bottom wall connected to the back wall. The photographed object may be illuminated in a controlled manner. It is usually illuminated from the bottom, with the lateral and upper walls dispersing and reflecting the light. This type of construction of the devices results from the fact that controlled and dispersed light contained in a delimited and small volume improves the visibility of the item, especially one with polished surfaces. Photographing such items in daylight or in studio lighting is not preferable due to the variable lighting conditions and visible reflections of objects present within the range of the light—especially on the surface of polished items.

Visual control of the quality of surface and colors of finished items was ensured by the device known from the description of the invention U.S. Pat. No. 1,850,415, developed in the form of a half-cylinder with lighting distributed in the upper part and with door for placing the polished item under examination, for example a drill bit. Similar devices are also known and described in GB2487086, PL329419, JPH11 109460, JPH09288296, JP2006323168. One advantage of this type of devices is the impossibility to introduce reflections from the objects or colors of the surroundings onto the polished surfaces of the item being photographed or controlled. The only inconvenience is the image of the reflection of the camera lens but, with the miniaturization of contemporary lenses, it is a feature of little significance.

Another advantage of such devices is the possibility to freely rotate the item on a movable base—a table. This also allows for creation of moving animations. An object of numerous documentations of devices with rotating plates are the inventions US2010/0128462 with LED lighting of the rotating table, U.S. Pat. No. 6,106,124 in which the possibility to introduce a background has been provided, and the photographic camera is a separate element, and photographing takes place via an opening in the housing, U.S. Pat. No. 4,372,659, US2007172216, JP2000035607 with very limited capabilities with respect to moving the photographic camera in a long and protruding tube, CN202330966 or GB2492111. The last one of them comprises a rotating table in the shape of the letter L with rows of numerous linear light sources distributed at the back.

Competitive solutions are also known, for example the solution of MK Digital which allows for illumination of an item from each side but, due to the fixed location of the camera, enables to photograph objects only from the front and from the top.

The solutions described above either provide so-called shadowless illumination around the photographed item, which makes it impossible to freely move the camera to any place, or enable to move the camera but do not allow for changing the illumination. The solutions which favor moving the photographic camera on a plane within a 90 degree angle comprise an insufficiently illuminated stripe along the way of camera movement and two light zones on either side of the camera. Such lighting system or non-uniform illuminating planes cause visible reflections on the surface of the item.

BRIEF SUMMARY OF THE INVENTION

The purpose of the invention was to create a universal device for the photography of various types of small objects, particularly jewelry and watches, free of the disadvantages typical for the so-called shadowless photography, i.e. a device with the interior designed in a way allowing for contrast photography and emphasizing the features of glistening products.

The portable studio for item photography is developed as a closed container which comprises an immobile part—the base as well as the sides and a rotating table along with the movable, rotating housing, comprising two coaxial surfaces—inner and outer, in a shape approximating a cylinder and with a holder for the photographic camera. The housing is equipped with guiding rings placed in rollers attached to the base. One of the rings is provided with a number of openings for locking the position of the housing by means of an electromagnet. The outer surface of the housing constitutes an impermeable layer for the external light, while the inner surface constitutes a dispersing and permeable layer for the illumination sections distributed between the surfaces of the housing. The illumination is developed in the form of regularly distributed light sources, preferably slats with lighting diodes. Sections of such diodes are distributed along the lateral height of the cylinder in the form of a sector of the cylinder. The photographic camera is attached to the holder in the housing, preferably in its central part, and a stripe in proximity to the lens on the inner surface of the housing along the lateral height of the cylinder is darkened and brightens in both directions as the distance from the lens increases. The holder for attaching the photographic camera is adjustable and allows for angular change in the position of the camera. The sides of the device are equipped with removable covers. The attaching elements intended for attaching profile tips are located inside the covers, preferably in the form of magnets.

The device is characterized by considerably improved quality and uniformity of the illuminating planes along the lateral height of the cylinder and comfort in determining the location of the camera with respect to the photographed item. A zone of full illumination of the item is possible within an angle of approximately 300 degrees. Obviously, such range of the light is sometimes not preferable for bringing out the structure of surfaces, especially the glistening and polished ones. Hence the use of several independent illumination sections with the possibility of the rotational movement of the whole housing. Combining the new rotating housing with the horizontal distribution of the illumination sections considerably increases the practical possibilities of using the device, the quality and depth of the photographs.

BRIEF DESCRIPTION OF THE SEVERAL VIEWS OF THE DRAWING(S)

Figure 2:
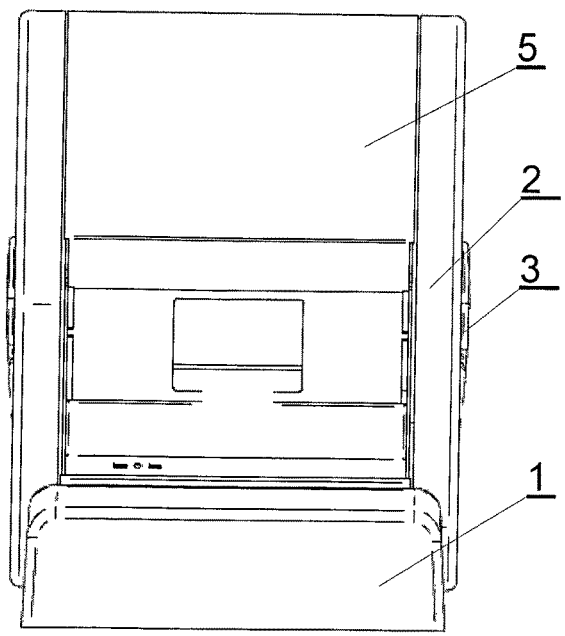
Figure 3:
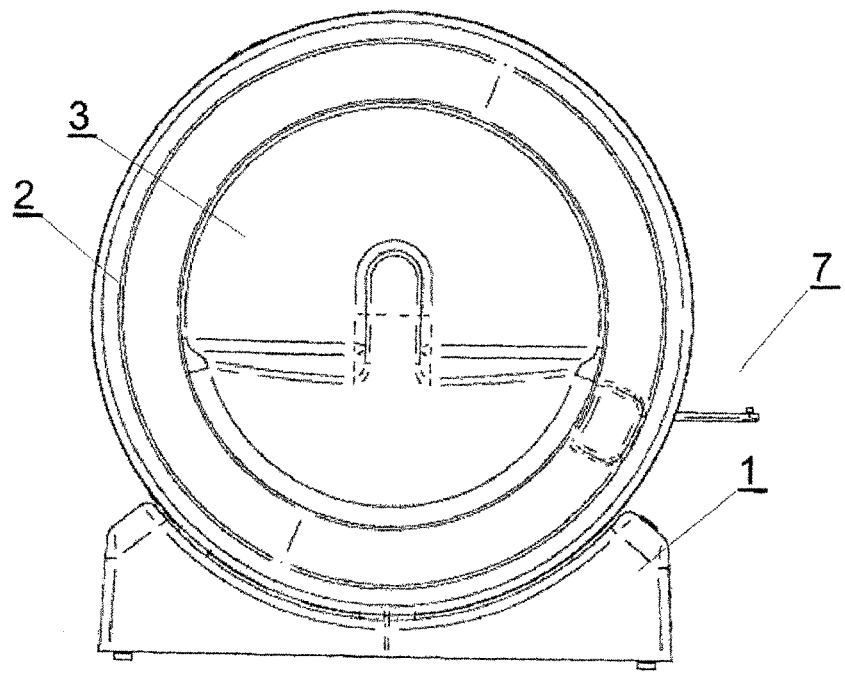
Figure 4:
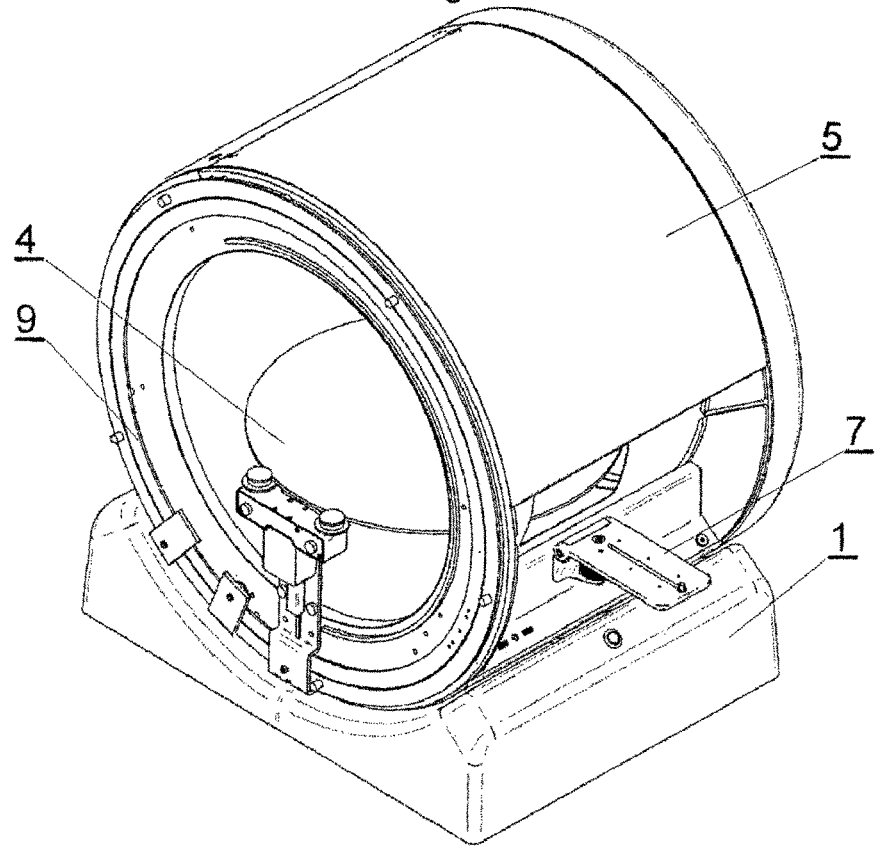
Figure 5:
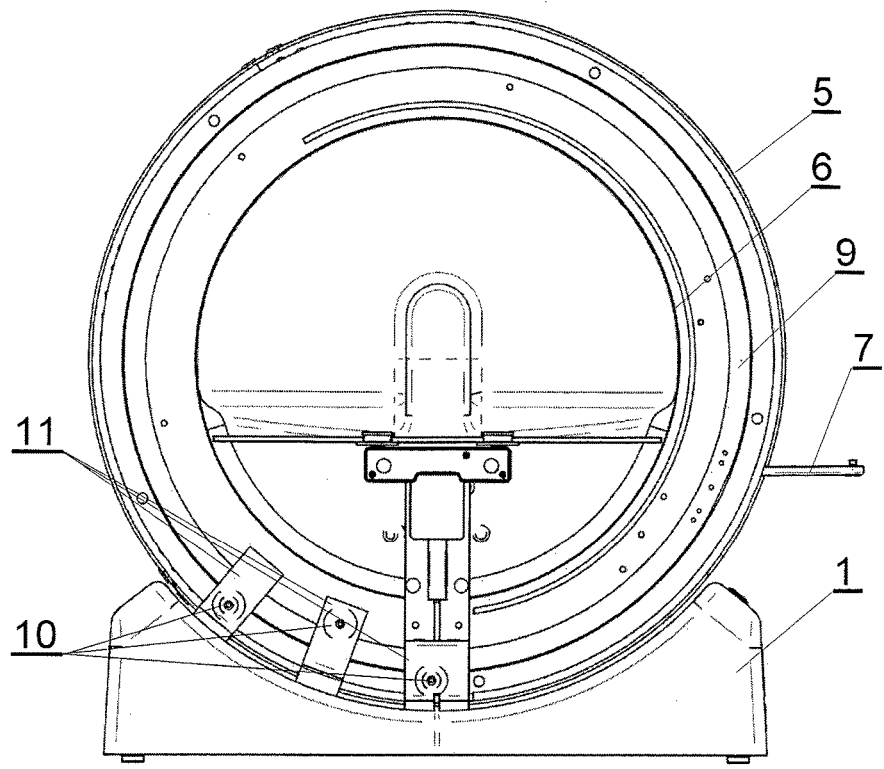
Figure 6:
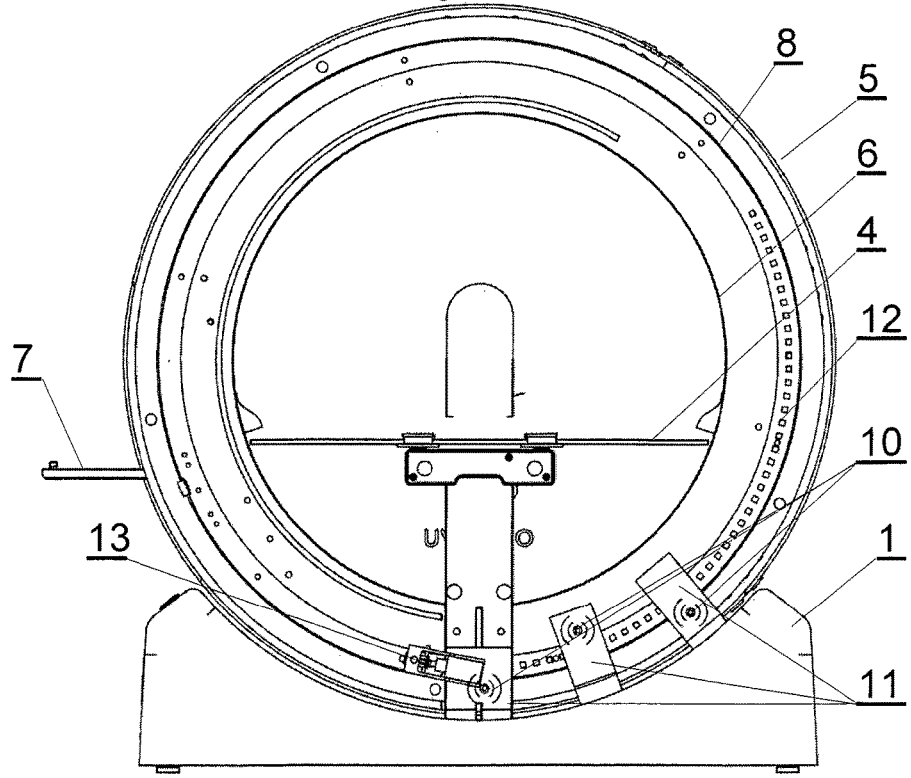
Figure 7:
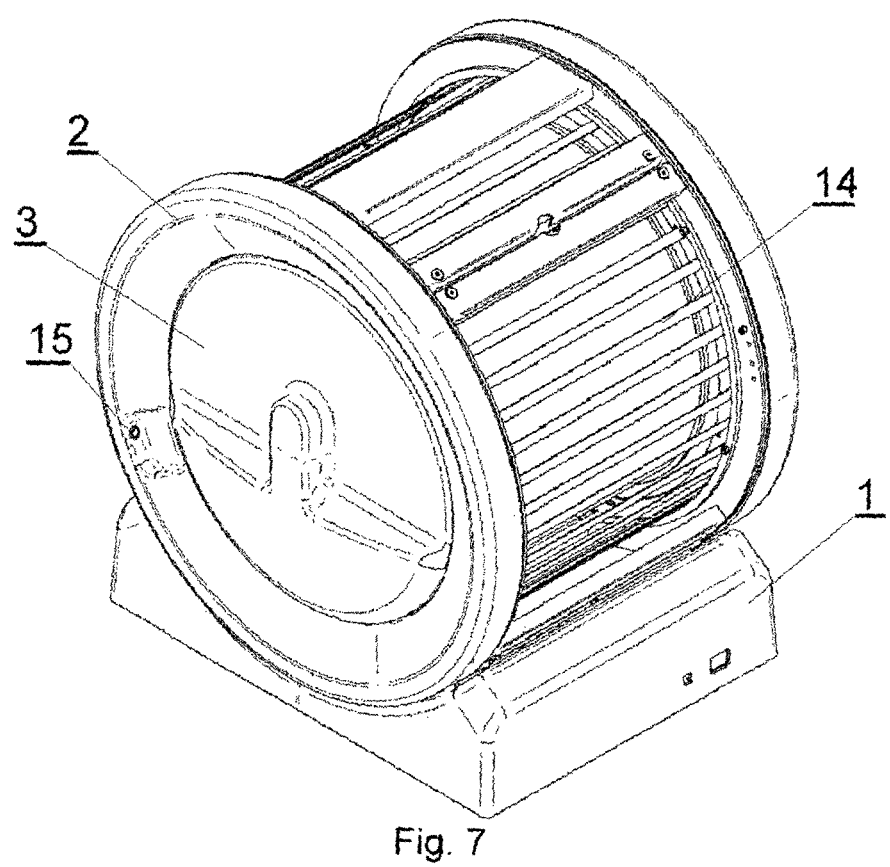
Figure 8:
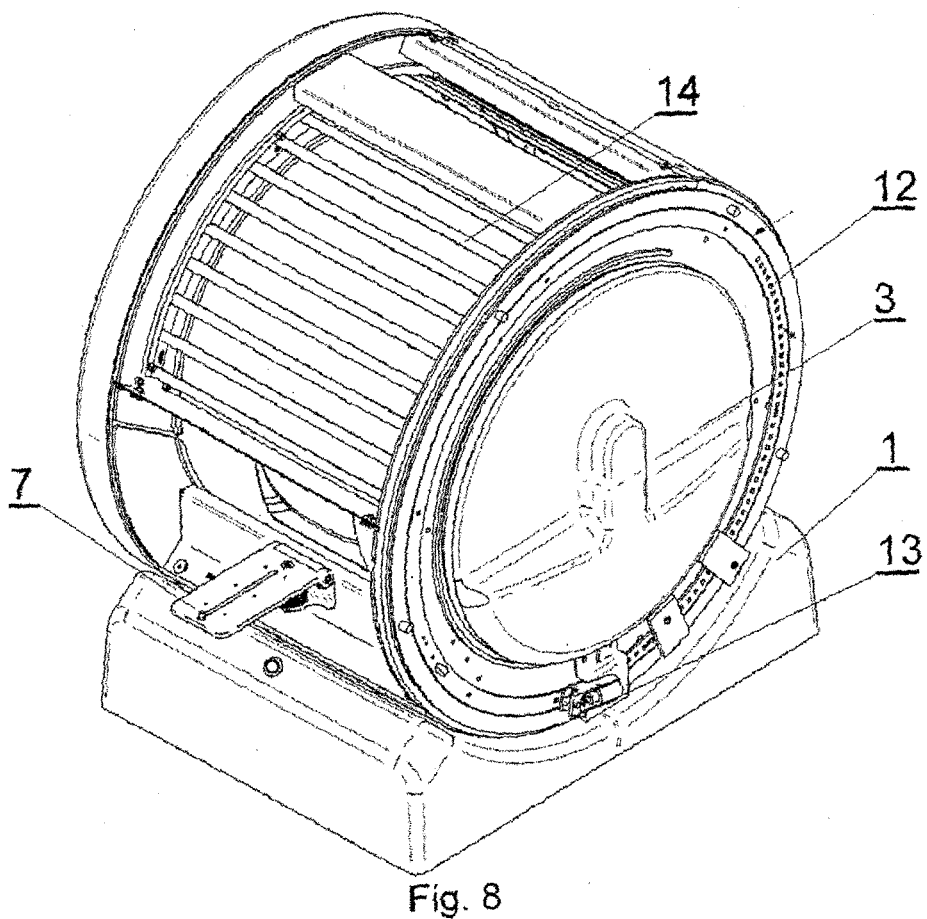

The object of the invention has been presented in an embodiment in the drawing, where FIG. 1 presents an axonometric view of the device, FIG. 2—the view from the side of the housing, FIG. 3—from the side, FIGS. 4 and 5—an axonometric view and the view from the side of the device after removing the elements covering the mechanisms driving the rotating table and attaching the housing, FIG. 6—a similar side view from the other side of the device, FIG. 7—the view of the device from the side opposite to the photographic camera after removing the outer surface of the housing, and FIG. 8—a similar view but from the side of the photographic camera and additionally after removing the element covering the elements which attach the housing to the base.

DETAILED DESCRIPTION OF THE INVENTION

The portable studio for item photography is developed as a closed container which comprises an immobile part—base 1 and sides 2 with lateral covers 3 and rotating table 4 as well as movable housing, comprising two coaxial surfaces—outer 5 and inner 6, in a shape approximating a cylinder with secure attachment 7 for the photographic camera. The housing is equipped with guiding rings 8, 9 on both sides. These rings are introduced between rollers 10 secured in roller holders 11 attached to the base. On each side, there are three such rollers for accurate support of the rings. The roller assemblies on both sides are distributed asymmetrically to each other, except for the lowermost rollers adjacent to the lower part of the rings. One of the rings is additionally provided with a number of openings 12 for locking the position of the housing by means of an electromagnet 13.

The outer surface of the housing 5 constitutes an impermeable layer for the external light, while the inner surface 6 constitutes a dispersing and permeable layer for the illumination sections distributed between the surfaces of the housing. It is also possible to use dedicated surfaces for the photography of specific items, for example a surface which is partially dispersing and partially transparent. Such set may be used to photograph items which require both soft and direct light—cut diamonds, gemstones.

The illumination is developed as regularly distributed light sources, preferably slats 14 with lighting diodes. The number of sections may be equal to the number of slats or a part thereof, but in practice the neighboring slats are grouped and it is optimal to create from them approximately six sections. The sections of such grouped diodes are distributed along the lateral height of the cylinder in the form of a sector of the cylinder.

The photographic camera is attached onto a tippable holder 7 in the housing, preferably in its central part. The tippable holder is equipped with adjusting elements—a screw and a knob. This holder has the ability to move and provides adjustment of the tilt angle of the camera within a limited range between −10 degrees and +30 degrees enabling to photograph products of various heights. A stripe in proximity to the lens on the inner surface of the housing along the lateral height of the cylinder is darkened and brightens in both directions as the distance from the lens increases. In this area, the dispersing surface is covered with black paint over its entire width, gently shading into the white color. As a result, there is no unexpected reflection of the lens on the photographed object, with preferable shading from black into white instead, which also allows for bringing out the features of the product. Additionally, it is possible to attach additional light sources inside the device, for example a spot type lamp.

The sides 2 of the device, immobile and attached to the base, are equipped with removable covers 3, The covers are preferably secured in the openings on the sides by means of magnetic holders. Attaching elements intended for attaching replaceable profile tips are placed inside the covers, also preferably in the form of magnets. These tips can be reflective (mirror), light-suppressing (black), dispersing (white). By means of various tips, varying effects can be obtained depending on the photographed items. It is a way to obtain contrast illumination which better depicts the physical features of a product, e.g., a black and white reflection on a glistening ring.

The device is controlled by means of the software installed on a computer which enables to control the illumination, the rotating table and the photographic camera. By means of the release button 15 the user may rotate the cylinder within the range of 0-90 degrees.

The invention claimed is:

1. A portable studio for item photography in the form of a closed container whose base, sides and a rotating table are immobile and interconnected and which comprises a holder for attaching a photographic camera, equipped on the inside with the rotating table and light sources, characterized in that it has a rotating housing, consisting of two coaxial surfaces—outer (5) and inner (6) in a shape approximating a cylinder, between which light sources (14) are distributed horizontally and in sections.

2. The studio according to claim 1, characterized in that the housing is equipped with guiding rings (8, 9) placed in rollers (10) attached to the base (1).

3. The studio according to claim 2, characterized in that one of the rings is provided with a number of openings (12) for locking the position of the housing by means of an electromagnet (13).

4. The studio according to claim 1, characterized in that the outer surface of the housing (5) constitutes an impermeable layer for the external light, while the inner surface (6) constitutes a dispersing and permeable layer for the illumination sections distributed between the surfaces of the housing.

5. The studio according to claim 1, characterized in that the illumination is developed as regularly distributed light sources, preferably slats (14) with lighting diodes, forming sections which are distributed along the lateral height of the cylinder in the form of a sector of the cylinder.

6. The studio according to claim 1, characterized in that the photographic camera is attached to the holder (7) in the housing, preferably in its central part, and a stripe in proximity to the lens on the inner surface of the housing along the lateral height of the cylinder is darkened and brightens in both directions as the distance from the lens increases.

7. The studio according to claim 6, characterized in that the holder (7) for attaching the photographic camera is adjustable and allows for angular change in the position of the camera.

8. The studio according to claim 1, characterized in that the sides of a device are equipped with removable covers (3) and attaching elements intended for attaching profile tips are located inside the covers, preferably in the form of magnets.

\* \* \* \* \*